Figure 1:
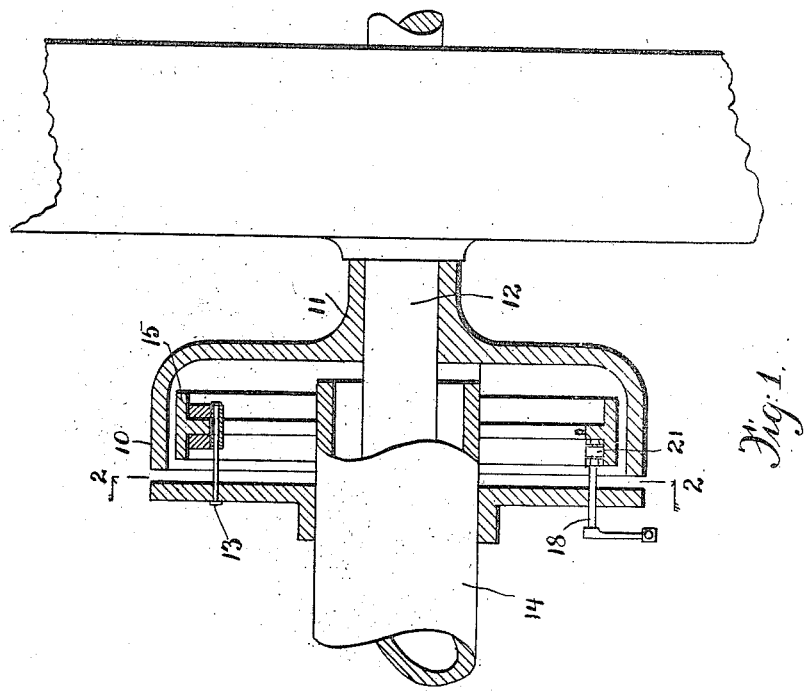

W. S. HUTCHINSON.
BRAKE OPERATING MECHANISM.
APPLICATION FILED SEPT. 25, 1915.

1,192,524.

Patented July 25, 1916.
3 SHEETS—SHEET 1.

Witnesses:

William S. Hutchinson, Inventor
By his Attorney,

W. S. HUTCHINSON.
BRAKE OPERATING MECHANISM.
APPLICATION FILED SEPT. 25, 1915.

1,192,524.

Patented July 25, 1916.
3 SHEETS—SHEET 2.

Witnesses:
Arthur S. Dannell

William S. Hutchinson, Inventor
By his Attorney,
W. P. Hutchinson.

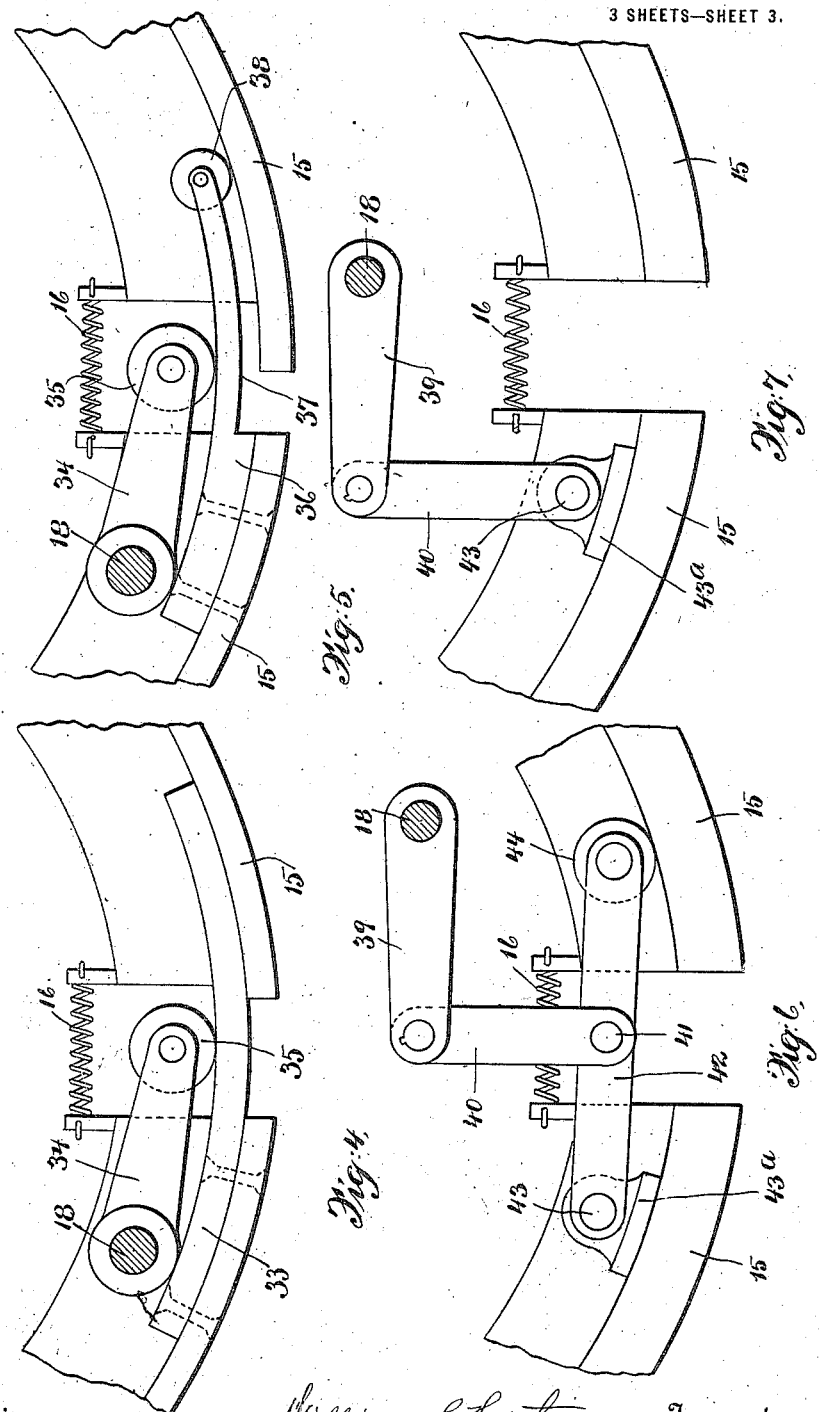

UNITED STATES PATENT OFFICE.

WILLIAM SANFORD HUTCHINSON, OF OYSTER BAY, NEW YORK.

BRAKE-OPERATING MECHANISM.

1,192,524.  Specification of Letters Patent.  Patented July 25, 1916.

Application filed September 25, 1915. Serial No. 52,639.

*To all whom it may concern:*

Be it known that I, WILLIAM S. HUTCHINSON, a citizen of the United States, and a resident of Oyster Bay, Nassau county, New York, have invented a new and useful Improvement in Brake-Operating Mechanism, of which the following is a full, clear, and exact description.

My invention relates to improvements in brake operating mechanism, and more especially to such mechanism when used in connection with drum vehicle brakes.

Still more particularly my invention relates to that class of brakes in which a shoe extends nearly around the inner surface of the drum, and has devices so that when brought into frictional contact with the drum, the shoe will be thereby set firmly so as to efficiently brake the drum and its connected mechanism.

With most drum brakes considerable power is necessary to set the brakes, and various lever devices are used to give to the operator sufficient power to lock the brakes, and generally toggle or similar mechanism is used in connection with the brake shoe to force it against the drum with sufficient friction, and likewise considerable energy is required to release it.

My invention is intended to operate in connection with brake shoes which are, to a certain extent, self-setting, and which are normally contracted so as to be out of frictional engagement with the drum, and which furthermore require very little throw to bring them into such frictional engagement.

My invention provides a simple and sufficiently strong means of quickly bringing the shoe and drum into frictional engagement, and when the setting mechanism is released, the shoe is automatically released from its frictional contact with the drum.

My invention is also intended to provide means for setting the shoe so as to operate with great force when required, or with lesser force when the car is simply to be checked, as for instance in backing, all of which will be clearly understood from the description which follows.

Reference is to be had to the accompanying drawings forming a part of this specification, in which similar reference characters indicate corresponding parts in all the views.

Figure 2:
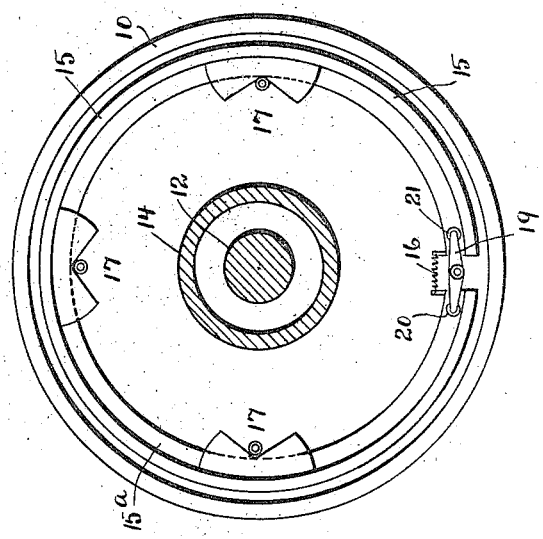
Figure 3:
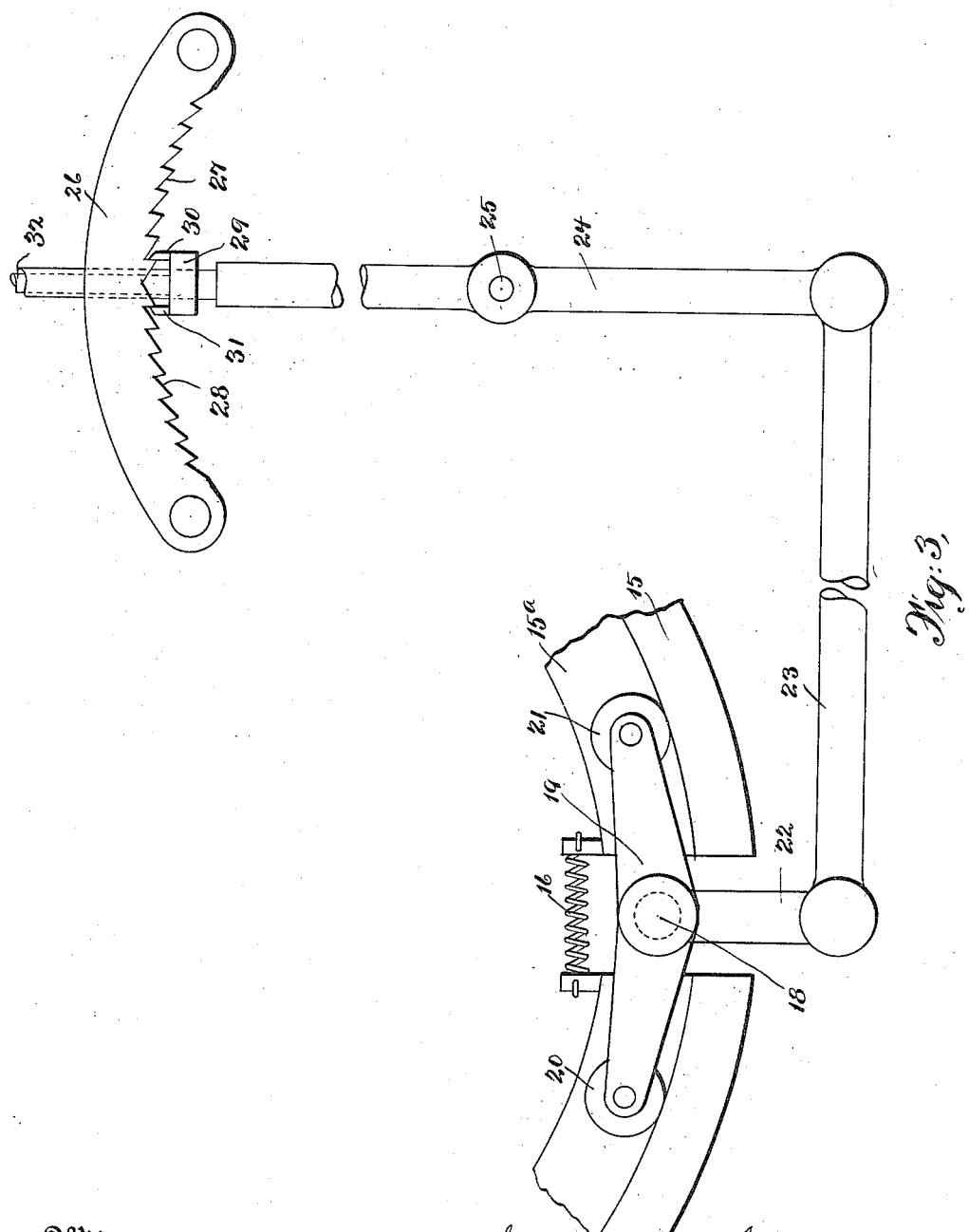

Figure 1 is a cross section of a drum brake and connected mechanism showing my improvements. Fig. 2 is a cross section on the line 2—2 of Fig. 1. Fig. 3 is a broken elevation of mechanism which can be used in connection with my invention. Fig. 4 is a sectional elevation of another form of the brake setting mechanism. Fig. 5 shows a view similar to Fig. 4, but with slightly modified construction. Fig. 6 shows a sectional elevation of another modification in which an equalizer is used at the meeting ends of the shoe, and Fig. 7 shows still another modification of the invention.

Figs. 1 and 2 show a conventional drum 10 which is connected to the wheel hub 11 and runs on the axle 12 as usual. A fixed plate 13 is arranged on the housing 14 of the axle, but obviously the style and connection of the drum and the arrangement of the stationary support opposite the drum, can be of any approved character, and has nothing to do with my invention which relates to the operation of the shoe 15 within a drum 10 of any kind which it is desired to brake. In the type of brake referred to, however, the shoe 15 extends nearly around the inner circumference of the drum, and it is normally held out of contact with the inner surface of the drum by springs 16 attached to the shoe near its ends. Various devices 17 are used in this type of brake, which when the shoe is forced into frictional contact with the drum, will serve by the motion of the drum and shoe to set the shoe into firm contact with the drum. My invention is intended to operate in connection with such mechanism, but obviously it is not material what sort of devices are used to set the shoe.

It will be seen that in a structure of this kind very little movement is required to bring the shoe into contact with the drum, in fact usually the movement is about equal to the thickness of the shoe, and this movement should be imparted to the shoe near its ends. For this purpose a crank shaft 18 is extended through the support 13 at a point between the meeting ends of the shoe 15, or at a point adjacent to said ends, and this crank shaft has in the form shown in Figs. 1, 2 and 3, at its inner end, a double crank arm 19 extending from both ends of the crank shaft, one end terminating in a roller 20 and the other in a roller 21 which rollers ride on the end portions of the shoe 15. It will be seen, therefore, that if the arm 19 is tilted in one direction it will bring the end of the shoe opposite the roller 20 into frictional contact with the drum 10, while if the arm is tilted in the opposite direction, the opposite end of the shoe will be first brought into contact with the drum, and it will be further noticed that while the rollers 20 and 21 are advisable to avoid unnecessary friction, still the action would be the same if the crank arm 19 were not provided with rollers. The function of this double arm 19 is to provide means for setting the shoe with greater or less force as desired. For instance if the drum 10 is turning in the direction of the arrow in Fig. 2, and the end of the shoe 15 opposite the roller 20 is first thrown in contact with the drum, the action will be relatively strong, because the shoe, when this end portion is in contact with the drum, will have a dragging effect throughout its entire length upon the drum surface, and this action serves to check the drum quicker than if the opposite end of the shoe were first applied to the drum. It will be seen that if the crank arm 19 is rocked in either direction, the tendency will be to press one end portion of the shoe inward against the drum 10 and against the tension of the springs 16, and that when the inward pressure from the crank arm is released, the springs 16 will quickly release the shoe from contact with the drum.

Any suitable cam mechanism can be used for rocking the crank arm and shaft 18, and I have shown conventional mechanism except for the means of regulating the direction of movement. As illustrated the shaft 18 is provided with a crank 22 which connects by means of the brake-rod 23 with the brake lever 24 which can be pivoted in the car as usual as shown at 25, and which moves above the pivot opposite the rack 26. This, however, instead of being the usual rack, has teeth 27 and 28 near opposite end portions, of opposite pitch. A collar 29 slides as usual on the shaft of the lever but instead of having a single pawl is provided with pawls 30 and 31 of opposite pitch which engage respectively the teeth 27 and 28 of the rack 26. The collar can be moved down by means of the slide rod 32 in the lever, which is of common construction. It will be seen, however, that the operator can slide down the collar 29 and move his lever in either direction, and that if moved in one direction, for instance toward the end having the teeth 28, the crank 18 will be operated so as to bring the end of the shoe 15 opposite the roller 20 first into contact with the drum 10, while if the lever 24 is moved in the opposite direction, the end of the shoe opposite the roller 21 will be first caused to impinge on the shoe 10. Thus if the operator wishes to set the brake positively, he will move the lever 24 in one direction; but if he wishes to merely check the drum and vehicle, he will move it in the opposite direction.

It is obvious that very many mechanical devices can be designed for moving one of the ends of the shoe 15 into contact with the drum 10, from the shaft 18, and in Figs. 4 to 7 I have shown several modifications of my invention adapted for this purpose, but without the idea of limiting myself to the particular structure shown, but more for the purpose of illustrating the fact that a great variety of such devices can be used without affecting the invention.

In Fig. 4 for instance, the crank shaft 18 is provided with a crank arm 34 one end of which is preferably provided with an anti-friction roller 35 which rides on a plate 33, one end of this being fastened to one end portion of the shoe 15, while the opposite end rides on the opposite end portion of the shoe. It will be seen that when the crank arm 34 is thrown outward toward the drum rim, the pressure will be imparted to the end portions of the shoe 15 and these will be simultaneously thrown against the surface of the drum; whereas when the pressure is released, the springs 16 will return the shoe to neutral position.

Fig. 5 shows a slight modification of the structure illustrated in Fig. 4. In this case a plate 26 is substituted for the plate 33, and an extension 37 extends opposite the adjacent end of the shoe 15, and is preferably provided with an anti-friction roller 38. The arm 34 bears through the roller 35 upon the extension 37, and when pressure is applied, the end portions of the shoe are moved outward into frictional contact with the drum rim and the setting devices 17, forcing the shoe outward against the said rim.

In Fig. 6 I have shown another modification in which an equalizer bar is used to provide equal pressure on both ends of the shoe 15. Here a friction arm 39 is fixed to the shaft 18, and a link 40 pivotally connects the arm with an equalizer bar 42 which at one end is pivoted as shown at 43 to a lug 43$^a$ on one end of the shoe 15, while at the opposite end of the equalizer bar is a roller 44 riding on the opposite end portion of the shoe 15. The action here is substantially as in the other cases, however, and pressure on the equalizer bar will force both ends of the shoe 15 outward with equal pressure against the drum rim.

In Fig. 7 I have shown another slight modification for moving one end portion of the shoe into contact with the drum, and in this case the equalizer bar 42 is dispensed with, but the link 40 is connected directly to one end of the shoe by means of the pivot 43 and lug 43$^a$, so that when outward pressure is applied to the crank arm 29, it will move the other end outward into contact with the drum rim.

From the foregoing description it will be clearly seen that very little energy is required to set the brake, only sufficient being used to force the shoe 15 into contact with the rim of the drum, and it will be seen that it is a very simple matter to throw either end of the shoe into such frictional contact, or if preferred to throw both ends of the shoe with equal force into such frictional contact. It will be further seen that the mechanism is very simple, inexpensive, and easily applied, and that because of its simplicity there is practically no danger of its getting out of order. It will be further understood that while I have shown the usual and preferred means of actuating the crank shaft 18, any suitable mechanism can be connected to the shaft to rock it.

I claim:—

1. The combination with a drum brake comprising a drum, and a shoe extending along the inner surface of the drum with its ends spaced apart and adapted to engage the drum throughout essentially its whole length, of means for holding the shoe out of contact with the drum, means actuated by frictional contact of the shoe and drum for increasing the pressure of the shoe against the drum, and selective means for forcing either end portion of the shoe into contact with the drum.

2. A drum brake having a drum, a shoe extending along the inner surface of the drum and adapted to engage the drum throughout essentially its whole length, the end portions of the shoe being spaced apart, means independent of the setting mechanism for forcing the shoe against the drum, means for normally holding the shoe out of contact with the drum, and means for forcing the desired end portion of the shoe into frictional contact with the drum.

3. In a drum brake having a drum, a shoe extending around the inner surface of the drum rim and with its end portions spaced apart, and means independent of the setting mechanism for forcing the shoe into firm contact with the drum, means for normally holding the shoe out of such frictional contact with the drum, and a crank mechanism for separately forcing either end portion of the shoe into such frictional contact with the drum.

4. A drum brake having a drum, a shoe extending along the inner surface of the drum and adapted to engage the drum throughout essentially its whole length, the end portions of the shoe being spaced apart, means independent of the setting mechanism for forcing the shoe against the drum, means for normally holding the shoe out of contact with the drum, a crank arm located adjacent to the end portions of the shoe, and means actuated by the rotation of the crank arm to force said shoe ends against the drum.

5. In a drum brake having a drum, a shoe acting against the inner face of the drum and with its ends spaced apart, and mechanism actuated by the frictional contact of the shoe and drum for increasing the pressure of the shoe against the drum rim, means for normally holding the shoe out of frictional contact with the drum, means for forcing either end portion of the shoe against the drum, and locking means for holding the shoe and drum in contact.

6. A drum brake having a drum, a shoe extending along the inner surface of the drum and adapted to engage the drum throughout essentially its whole length, the end portions of the shoe being spaced apart, means independent of the setting mechanism for forcing the shoe against the drum, means for normally holding the shoe out of contact with the drum, and means for forcing the end portions of the shoe into contact with the drum.

WILLIAM SANFORD HUTCHINSON.

Witnesses:
 E. F. CHESHIRE,
 E. FLOYD GRIFFIN.